United States Patent [19]
Yamaguchi et al.

[11] Patent Number: 5,765,771
[45] Date of Patent: Jun. 16, 1998

[54] POSITIVE SECUREMENT FOR A FISHING REEL HANDLE FOLDING DEVICE

[75] Inventors: Akira Yamaguchi, Iruma; Masatoshi Katayama, Kodaira, both of Japan

[73] Assignee: Daiwa Seiko, Inc., Higashikurume, Japan

[21] Appl. No.: 802,290

[22] Filed: Feb. 18, 1997

Related U.S. Application Data

[63] Continuation of Ser. No. 501,488, Jul. 12, 1995, abandoned.

[30] Foreign Application Priority Data

| Jul. 13, 1994 | [JP] | Japan | 6-161177 |
| Jul. 14, 1994 | [JP] | Japan | 6-162368 |
| Jul. 21, 1994 | [JP] | Japan | 6-191124 |
| Mar. 23, 1995 | [JP] | Japan | 7-064113 |

[51] Int. Cl.$^6$ .................................................. A01K 89/01
[52] U.S. Cl. .................................... 242/284; 74/574
[58] Field of Search ............................... 242/284, 283; 74/574

[56] References Cited

U.S. PATENT DOCUMENTS

| 1,743,241 | 1/1930 | Schmidt | 547/547 |
| 4,437,621 | 3/1984 | Sakumoto | 74/547 X |
| 4,588,141 | 5/1986 | Uetsuki et al. | 74/547 |
| 4,858,845 | 8/1989 | Kaneko | 242/285 |
| 5,368,249 | 11/1994 | Takeuchi | 74/547 X |

FOREIGN PATENT DOCUMENTS

| 225469 A1 | 4/1988 | Germany | 242/284 |
| 1-098435 | 4/1989 | Japan . | |
| 4-133176 | 12/1992 | Japan . | |
| 6-013472 | 2/1994 | Japan . | |
| 982416 | 2/1965 | United Kingdom | 74/547 |

Primary Examiner—Daniel P. Stodola
Assistant Examiner—Emmanuel M. Marcelo
Attorney, Agent, or Firm—Longacre & White

[57] ABSTRACT

A handle folding device for use in a fishing reel, capable of preventing a handle from being erroneously folded during the winding operation of the handle. A handle can be moved from the stand-up condition thereof to the folded condition thereof by operating a handle stopper. A handle stand includes a projecting portion having a tapered engaging portion and a preventive portion for preventing the movement of the handle stopper. The tapered engaging portion and preventive portion are contactable with the handle stopper. The preventive portion prevents the movement of the handle stopper during the winding operation of the handle.

16 Claims, 12 Drawing Sheets

POSITIVE SECUREMENT FOR A FISHING REEL HANDLE FOLDING DEVICE

This is a continuation of application Ser. No. 08/501,488 filed Jul. 12, 1995, which was abandoned upon the filing hereof.

BACKGROUND OF THE INVENTION

The present invention relates to a handle folding device for use in a fishing reel.

FIG. 1 is a view of the whole structure of an ordinary spinning reel which is one of fishing reels. The spinning reel comprises a reel main body 1 provided with a rotor 5. The rotor 5 is rotatably supported on a pipe shaft 2 and includes a bail 6. A spool shaft 4 is inserted into the pipe shaft 2 and, to the leading end portion of the spool shaft 4, there is fixed a spool 7 around which a fishline is to be wound. The pipe shaft 2 includes a pinion 2a which is in mesh with a main gear 12. The main gear 12 is in engagement with a shaft 17a of a handle 17 mounted on the reel main body 2, and can be rotated by operating the handle 17. Also, the main gear 12 is connected to the spool shaft 4 through an oscillating mechanism (not shown), and thus the spool shaft 4 can be moved back and forth by operating the handle 17. As mentioned above, since the rotor 5 having the bail 6 can be rotated and the spool 7 can be moved back and forth by operating the handle 17, the fishline can be wound around the spool 7. Here, the handle 17 is structured such that the mounted position thereof can be changed according to whether an operator is a right hander or a left hander.

Now, conventionally, the handle used in the fishing reel is structured such that it can be folded when not in use for convenient portability. For example, in Japanese Patent Kokai Publication No. Hei. 1-98435, there is disclosed a handle folding device which can be used in the spinning reel shown in FIG. 1.

According to the handle folding device disclosed in the above publication, the handel 17 is pivotably supported on a handle stand 15 and, between the handel 17 and handle stand 15, there is interposed a handle stopper 18 which can be slid by means of a spring and includes a tapered surface. The tapered surface of the handle stopper 18 is in engagement with a tapered surface formed in the handle stand 15. That is, if the handle stopper 18 is pushed in against the energizing force of the spring to thereby release the engagement between the two tapered surfaces, then the handle 17 can be folded from the illustrated stand-up position thereof to the folded portion thereof. Also, if the handle 17 is returned back to the stand-up position, then the handle 17 can be held at the stand-up position due to a wedge action caused by the two tapered surfaces of the handle stopper and handle stand.

However, while the handle 17 is held at the stand-up position, the rotational operation of the handle 17 for winding the fishline may cause a folding-direction force to the handle stopper 18 according to the right- or left-handed mounting position of the handle 17. That is, this force gradually pushes the handle stopper 18 against the energizing force of the spring and the reaction of the tapered surfaces is added to this, so that the handle stopper 18 can become loose gradually. In particular, the winding operation with high load makes this drawback remarkable, and at worst, the handle 17 is accidentally folded even during the winding operation.

To solve this problem, in Japanese Utility Model Kokai Publication No. Hei. 6-13472, there is disclosed a structure in which an engaging recessed portion is formed in the end portion of the handle stopper in such a manner that the engaging recessed portion can be engaged with an opening formed in the handle in order to prevent the handle stopper from being pushed in during the winding operation even when the folding-direction force is applied to the handle stopper.

However, because the handle stopper moves until the engaging recessed portion of the handle stopper is engaged with the opening of the handle, the handle stopper is likely to clatter during the handle winding operation. Also, because of the retainment structure with use of the engaging recessed portion, seawater, a foreign matter or the like is easy to attach to the engaging recessed portion, which makes it difficult to securely retain the engaging recessed portion to the opening of the handle, and thus the handle can be folded even during the winding operation.

Also, in the structure disclosed in either of the above-mentioned publications, the tapered portion of the handle stopper and the tapered portion of the handle stand for engagement with each other are formed on the handle folding side with respect to the axially supported portion of the handle. Therefore, if the wedge action is produced only in these tapered portions, then the amount of operation of the handle stopper becomes great so that the engaged portion between them becomes large in size. Also, due to variations in dimensions in the respective parts, when the handle is stood up, the stand-up condition of the handle cannot be stabilized.

In Japanese Utility Model Kokai Publication No. Hei. 4-133176, there is disclosed a handle folding device for use in a fishing reel which includes a mechanism for holding a handle in the folded condition thereof.

The handle folding device disclosed in the above publication includes a handle stand having a handle shaft, a handle pivotably supported on the handle stand while holding the handle stand between the forked portions of the handle, and a handle stopper interposed between the handle stand and handle. The handle can be rotated between a usable position (i.e. the stand up position) and a storage position (i.e. the folded position) with respect to the handle stand by operating the handle stopper. The handle stand includes a recessed portion extending in a direction at right angles to the handle folding direction, so that, after the handle is folded, the end portion of the handle stopper can be engaged with the recessed portion. That is, when the handle is folded, the end portion of the handle stopper is engaged with the recessed portion to thereby hold the handle at the folded portion.

In the above-mentioned conventional handle folding device as disclosed in Japanese Utility Model Kokai Publication No. Hei. 4-133176, however, due to the fact that, when folding the handle, the handle stopper is engaged with the recessed portion of the handle stand in the direction at right angles to the handle folding direction, the handle is likely to get loose with respect to the rotational direction of the handle. Also, to return the handle from the folded position back to the stand-up position thereof permitting use of the handle, the handle stopper must be slid and disengaged from the recessed portion. That is, the handle return operation is troublesome.

SUMMARY OF THE INVENTION

The present invention aims at eliminating the drawbacks found in the above-mentioned conventional handle folding devices.

Accordingly, it is an object of the invention to provide a handle folding device in a fishing reel which prevents a handle from clattering and being folded during the winding operation of the handle.

It is another object of the invention to provide a handle folding device for use in a fishing reel which, when a handle is folded, is capable of not only holding the folded handle positively but also returning the handle from the folded position back to the stand-up position with ease.

A handle folding device for use in a fishing reel, according to the present invention, comprises:

a handle stand formed on an end of a handle shaft, said handle stand defining a first parallel surface extending in a first direction, and a first tapered surface extending obliquely with respect to the first direction;

a handle supported on the handle stand and pivotable between a stand-up position to permit use of the handle and a folded position for storage of the handle, said handle having a second parallel surface extending in the first direction when said handle is pivoted to said stand-up position;

a handle stopper mounted between the handle stand and the handle, and slidable in the first direction along the second parallel surface when said handle is located at said stand-up position, the handle stopper having an operation portion and defining a third parallel surface contactable with the first parallel surface and a second tapered surface contactable with the first tapered surface, wherein said third parallel surface is located opposite from the operation portion with respect to the second tapered surface; and energizing means for energizing said handle stopper to project said operation portion, and to forcibly contact the second tapered surface with the first tapered surface when said handle is pivoted to said stand-up position to thereby maintain said handle at said stand-up position using a wedge action.

A handle folding device for use in a fishing reel, according to the present invention, comprises:

a handle stand formed on an end of a handle shaft; a handle mounted on the handle stand and pivotable about an pivot axis to move between a stand-up position to permit use of said handle and a folded position for storage of said handle, said axis defining a handle stand-up direction side and a handle folding direction side;

a handle stopper having an engaging portion and slidably interposed between said handle stand and said handle; and energizing means for energizing said handle stopper to stand up said handle and maintain said handle at said stand-up position through said engaging portion in cooperation with a tapered engaging portion of said handle stand, wherein:

said tapered engaging portion is formed at least on an end portion of said handle stand, said end portion facing said handle and being located in said handle folding direction side with respect to said pivot axis; and a preventive portion for preventing movement of said handle stopper is formed on said end portion of said handle stand and located adjacently to said tapered engaging portion.

A handle folding device for use in a fishing reel, according to the present invention, comprises:

a handle stand formed on an end of a handle shaft;

a handle mounted on said handle stand and pivotable about a pivot axis to move between a stand-up position to permit use of said handle and a folded position for storage of said handle, said pivot axis defining a handle stand-up direction side and a handle folding side;

a handle stopper slidably fitted between said handle stand and said handle; and energizing means for energizing said handle stopper in a direction to stand up and hold said handle in said stand-up position, wherein:

a wedge engaging portion is formed in both said handle stand-up side and said handle folding side with respect to said pivot axis such that said handle stopper can achieve wedge engagement between said handle stand and said handle with the aid of energizing means.

A handle folding device for use in a fishing reel, according to the present invention, comprises:

a handle stand formed on an end of a handle shaft;

a handle is mounted on said handle stand and pivotable between a stand-up position permitting use of said handle and a folded position for storage of said handle;

a handle stopper slidably mounted between said handle stand and said handle;

energizing means for energizing said handle stopper to maintain said handle at said stand-up position when said handle is pivoted to said stand-up position;

an engaging element formed on said handle stand; and a securing element formed on said handle stopper, wherein:

when said handle is folded, said energizing means produces a force making said securing element to engage with said engaging element, to thereby retain said handle at said handle folding position through said force of said energizing means.

According to the present invention, even though a high load acts on the handle during the winding operation, the handle stopper is prevented from moving due to the high load.

Further, the wedge engagement portion extending in both sides with respect to the pivotably supported portion can make the wedge engagement stably and positively.

BRIEF DESCRIPTION OF THE DRAWINGS

FIG. 8A shows a state of the modification before a handle is folded; FIG. 8B shows a state thereof in which the handle is being folded; and, FIG. 8C shows a state thereof in which the handle is held at the folded position.

DETAILED DESCRIPTION OF THE PREFERRED EMBODIMENTS

Figure 1:
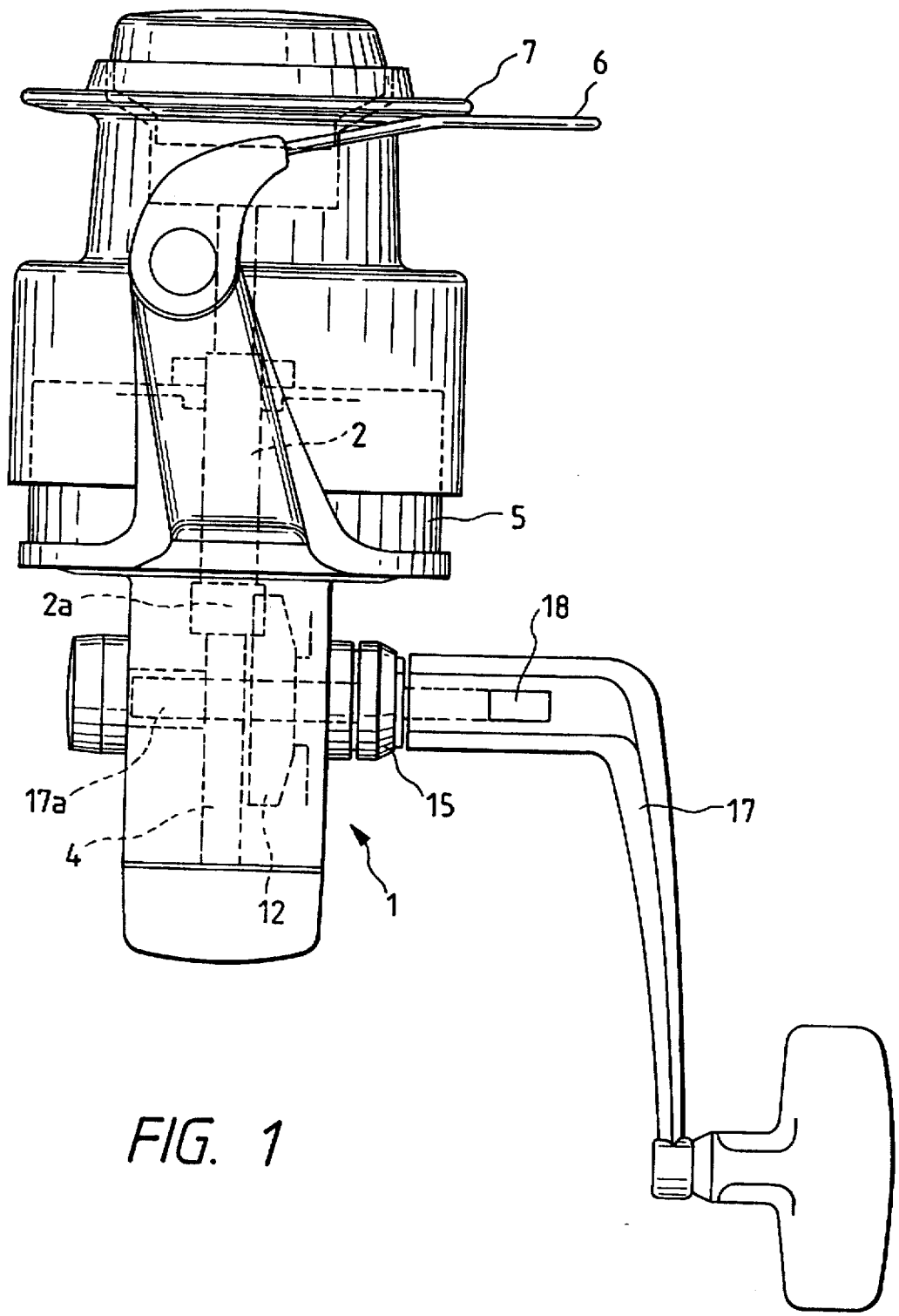
FIG. 1 is a view of a general structure of a fishing reel to which a handle holding device according to the invention is applied.

Now, description will be given below of the preferred embodiments of a handle folding device for use in a fishing reel according to the invention. The handle folding devices according to the preferred embodiments of the invention can be applied to a spinning reel, for example, as shown in FIG. 1.

Figure 2:
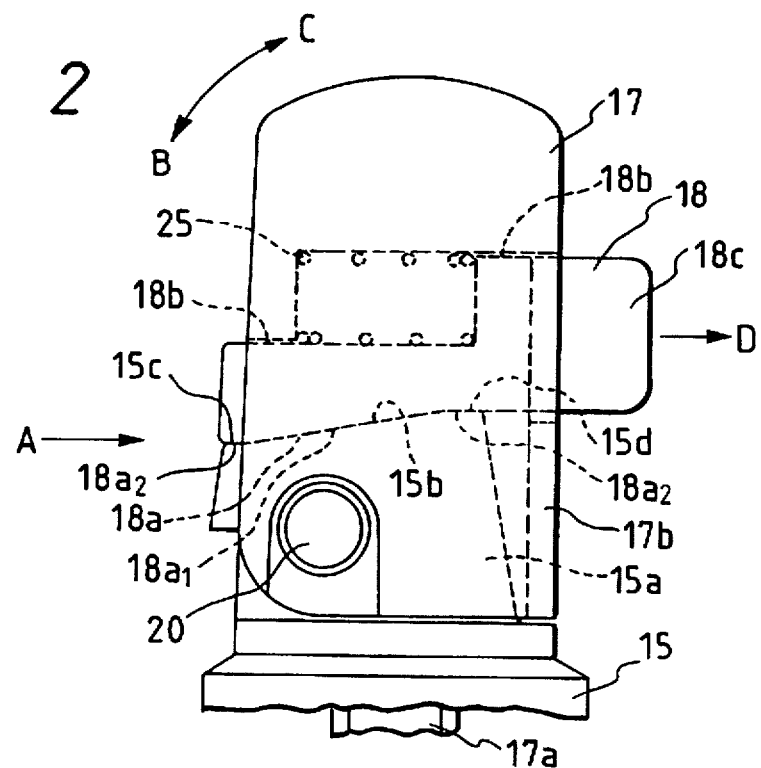
FIG. 2 is a front view of a first embodiment of a handle folding device according to the invention, in which a folding device portion thereof is enlarged.
Figure 3:
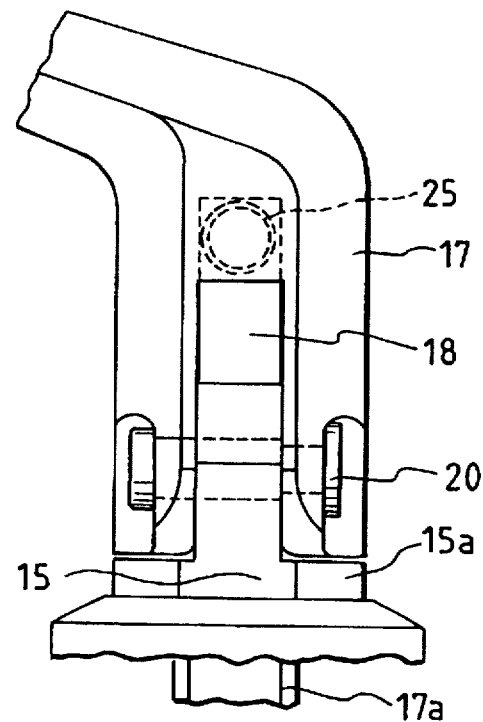
FIG. 3 is a view of the handle folding device shown in FIG. 2, when viewed from the A direction.

FIGS. 2 and 3 show a first embodiment of the present invention. A handle stand 15 can be mounted on a handle mounting portion of a reel main body on either of right and left sides according to whether an angler is a right hander or a left hander, and includes a handle shaft 17a which is engageable with a main gear provided in the reel main body. The handle stand 15 includes a projecting portion 15a onto which a forked handle 17 is pivotably supported through an pivotably supporting member 20 in such a manner that the projected portion 15a is held between the forked portions of the handle 17. Thus, the handle 17 is rotatable about the supporting member 20 in a folding direction B and a stand-up direction C.

A handle stopper 18 is interposed between the base end portion of the forked handle 17 and the projecting portion 15a of the handle stand 15. In the handle stopper 18, there are formed an engaging surface 18a engageable with a tapered engaging portion 15b and a preventive portion 15c respectively formed in the projecting portion 15a, and an operation surface 18b extending in a direction at substantially right angles (including right angles) with respect to the handle shaft 17a, so that the handle stopper 18 are free to slide in the direction substantially right angles with respect to the handle shaft 17a. The engaging surface 18a of the handle stopper 18 is made up of a slope surface $18a_1$ inclined with respect to a sliding direction in which the handle stopper 18 slides, and a planar surface $18a_2$ parallel to the sliding direction. In this embodiment, a pair of planar surfaces $18a_2$ are provided at both ends of the slope surface $18a_2$. The handle stopper 18 further includes an operation portion 18c which projects from the surface of the handle 17.

The projecting portion 15a of the handle stand 15 includes a tapered engaging portion 15b engageable with the engaging surface 18a, particularly the slope surface 18a, of the handle stopper 18, and a preventive portion 15c formed adjacent to, preferably, continuous with the tapered engaging portion 15b for engagement with the planar surface $18a_2$ to prevent the movement of the handle stopper 18 during the winding operation of the handle 17. The preventive portion 15c is formed by a surface which extends parallel to the sliding direction of the handle stopper 18 when the handle 17 is set at the stand-up position. Between the handle stopper 18 and handle 17, there is interposed energizing means, preferably, an energizing spring 25 which, as shown in FIG. 2, energizes the handle stopper 18 in a direction of an arrow D. In this structure, if the operation portion 18c of the handle stopper 18 is pressed against the energizing force of the energizing spring 25 to thereby remove the engagement of the tapered engaging portion 15b and preventive portion 15c of the projecting portion 15a from the engagement surface 18aof the handle stopper 18, then the handle 17 can be folded in a direction of an arrow B and set at the folded, storage condition thereof. Also, if the handle 17 is moved in a direction of an arrow C from the folded condition thereof, then a wedge action is produced between the engaging surface 18a of the handle stopper 18 and the tapered engaging portion 15b of the projecting portion 15a, whereby due to the wedge action the handel 17, as shown in FIG. 1, can be held at the stand-up position at which the handle 17 can be used.

The tapered engaging portion 15b and preventive portion 15c are respectively formed at least in the handle folding side (in the B direction) end portion of the projection portion 15a, while the preventive portion 15c is structured such that it engages with the planar surface $18a_2$ of the handle stopper 18 at the handle folding side to prevent the handle stopper 18 from being pushed in due to a load which would be generated during the winding operation of the handle 17. That is, if the winding operation of the handle 17 is performed with a high load, then a force in the arrow B direction is applied to the handle 17 to push out the handle stopper 18 along the tapered engaging portion 15b. In view of this, in order to prevent the handle stopper 18 from being gradually pushed out due to such force during the winding operation, the preventive portion 15c is structured in the following manner:

The preventive portion 15c is formed on one end side of the tapered engaging portion 15b, that is, on the handle folding side thereof, as a parallel surface which is substantially parallel (including parallel) to a slide operation surface 18b of the above-mentioned handle stopper 18 and is engageable with the planar surface 18a₂ of the handle stopper 18 when the handle 17 is set at the stand up position. Due to this structure, even if a high load is applied to the handle 17 in the arrow B direction, the leading end portion of the handle stopper 18, namely the planar surface 18a₂, is contacted with the parallel surface 15c serving as the preventive portion to receive the force in the arrow B direction, to thereby prevent the handle stopper 18 from being pushed out along the tapered engaging portion 15b. In other words, since the handle stopper 18 is not pushed out even if the high load is applied to the handle 17 in the arrow B, the handle 17 is prevented from getting loose or being folded during the winding operation of the handle 17. Also, the prevention of pushing-out of the handle stopper 18 can be achieved by a simple structure. Here, in FIG. 2, the parallel surface 15c and the leading end portion of the handle stopper 18 contactable with the parallel surface 15c respectively project from the surface of the handle 17. However, this is not limitative but, alternatively, they can be formed flush with the surface of the handle 17. The width and the degree of parallel of the parallel surface 15c with respect to the slide operation surface 18b are set in such a range that can prevent the handle stopper 18 from being pushed out during the winding operation of the handle 17.

Also, according to the embodiment shown in FIG. 2, on the other end side of the tapered engaging portion 15b, that is, on the stand-up side of the handle 17 thereof as well, there is formed a preventive portion 15d which is continuous with the tapered engaging portion 15b and is substantially parallel (including parallel) to the slide operation surface 18b and which is engageable with the planar surface 18a₂ of the handle stopper 18 when the handle 17 is set at the standup position. According to this structure in which the preventive portion 15d and the planar surface 18a₂ are formed on the other end side of the tapered engaging portion 15b as well, even if a high load is applied to the handle 17 in the handle stand-up direction during the winding operation of the handle 17, the base end portion of the handle stopper 18 is contacted with the preventive portion 15d to thereby be able to not only prevent the handle 17 from being loose but also prevent the handle stopper 18 from being pushed out. That is, this structure prevents the handle 17 from being loose not only on the handle folding direction side but also on the handle stand-up direction side, so that the winding operation of the handle 17 can always be performed stably.

Next, description will be given below of a second embodiment of a handle folding device according to the invention with reference to FIG. 4. In the second embodiment shown in FIG. 4, a preventive portion 15c is formed adjacent to a tapered engaging portion 15b, but the tapered engaging portion 15b and preventive portion 15c are not formed continuous with each other as contrary to the structure shown in FIG. 2. Even if the tapered engaging portion 15b and preventive portion 15 are not formed continuous with each other, there can be obtained a similar effect to the first embodiment. Also, in the second embodiment, a preventive portion 15d is not formed on the handle stand-up direction side as contrary to the structure shown in FIG. 2. Thus, when a load is applied in a direction of an arrow C, the leading end surfaces 17a of a forked handle 17 are contacted with the surface of a handle stand 15 to thereby prevent the whole handle 17 from being loose. Of course, in the second embodiment as well, the tapered engaging portion 15b and preventive portion 15c may be formed continuous with each other. Also, even if the preventive portion 15d and tapered engaging portion 15b shown in FIG. 2 may be formed in the not-continuous manner as in a third embodiment of the present invention shown in FIG. 5, there can be obtained a similar effect to the first embodiment.

Next, description will be given below of a modification of a handle folding device according to the invention with reference to FIGS. 6, 8A, 8B, 8C, 9 and 10.

Figure 6:
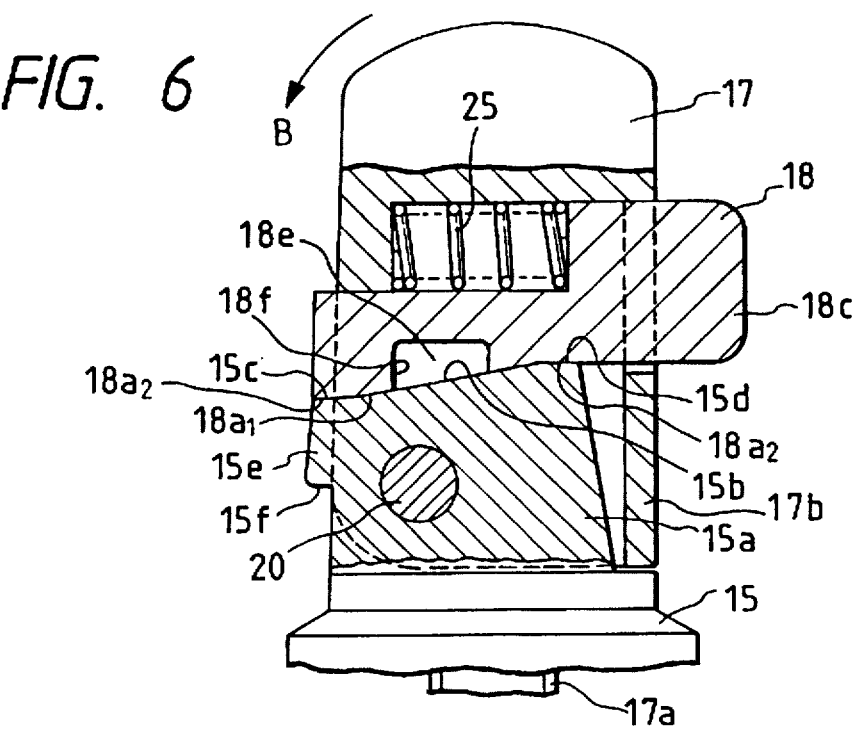
FIG. 6 is a view of a modification of a handle folding device according to the invention.

As described before, the handle 17 is structured such that, when the handle 17 is not in use, if the operation portion 18c of the handle stopper 18 is pressed against the energizing force of the energizing spring 25, then the handle 17 can be folded in a direction of an arrow B shown in FIG. 6. In this case, however, there is found a problem that, in the folded condition, the handle 17 can be moved to the stand-up position and become inconvenient to carry. For this reason, in the present modification, there is employed a structure in which, in addition to the effects obtained in the above-mentioned embodiments, there can be obtained a further effect that the handle 17 can be held at the storage position thereof stably and positively when not in use.

As shown in FIG. 6, in the projecting portion 15a of the handle stand 15, there is formed a projecting and securing piece 15e which projects from the surface of the handle 17 and which defines an engagement portion 15f. On the other hand, in the engaging surface 18a of the handle stopper 18, there is formed a recessed portion 18e defining an engagement portion 18f. When the handle 17 is held at the stand-up position due to the wedge action produced between the engaging surface 18a of the handle stopper 18 and the tapered engaging portion 15b of the projecting portion 15a, if the operation portion 18c of the handle stopper 18 is pushed against the energizing force of the energizing spring 25 (see FIG. 8A), then the handle stopper 18 is slid in such a manner as shown by a dotted line and, therefore, the above-mentioned wedge action is removed and thus the handle 17 becomes foldable (see FIG. 8B). If the handle 17 is folded further, then the engagement portion 18f defined by the securing recessed portion 18e is retained by the engagement portion 15f defined by the projecting and securing piece 15e (see FIG. 8C). In this state, an energizing force is applied to the handle stopper 18 by the energizing spring 25 in a direction in which the handle stopper 18 is projected upwardly and, for this reason, the engagement between the engagement portions 15f and 18f of the projecting and securing piece 15e and recessed portion 18e can be maintained. That is, the handle 17 is held on the handle stand 15 in an energized manner and thus the handle 17 can be held without getting loose. Also, to return the handle 17 from the folded position back to the stand-up position permitting use of the handle 17, if the handle 17 is rotated, then the recessed portion 18e can be disengaged from the projecting and securing piece 15e against the energizing force of the energizing spring 25, so that the return of the handle 17 back to the usable condition can be achieved with ease.

In the modification, the shapes and positions of the projecting and securing portion 15e and recessed portion 18e serving as engaging elements can be changed properly as far as they define engagement portions engageable with each other to retain the handle 17 in the folded position. Also, the sliding direction of the handle stopper is not limited to the illustrated direction but can be changed in other various directions, provided there is employed such a structure that the handle can be energized and held at the storage position by use of the energizing force of energizing means arranged for the handle stopper and the energizing force can be removed by means of a rotational operation to return the handle back to the usable position.

Figure 9:
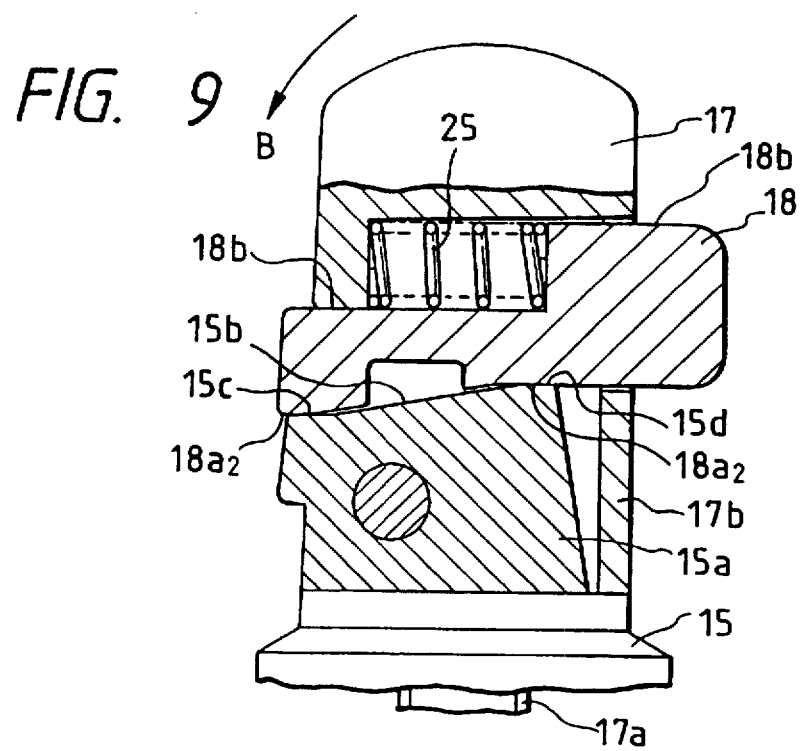
FIG. 9 is a view of the modification shown in FIG. 6 in a state where a force is applied to the handle in the handle folding direction during the winding operation of the handle.
Figure 10:
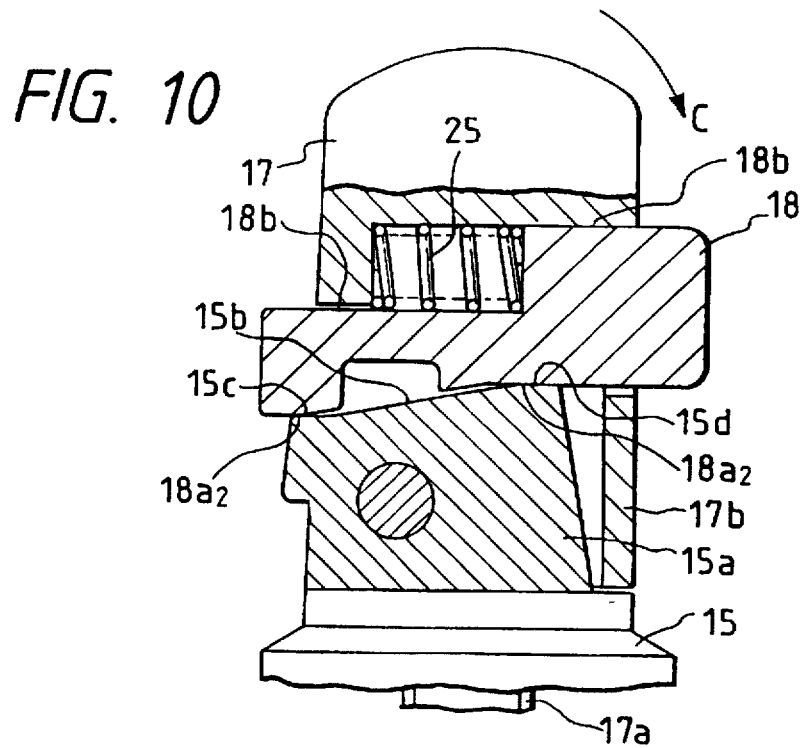
FIG. 10 is a view of the modification shown in FIG. 6 in a state where a force is applied to the handle in the handle standing-up direction during the winding operation of the handle.

Of course, in the present modification as well, similarly to the previously described embodiments, in order to prevent the handle 17 from being folded or clattering during the winding operation of the handle 17, in the projecting portion 15a of the handle stand 15, there are formed the preventive portions 15c and 15d continuous with the tapered engaging portion 15b. That is, as shown in FIG. 9, if a load is applied to the handle 17 in the handle folding direction shown by an arrow B, the planar surface $18a_2$ of the handle stopper 18 at the leading end side thereof is contacted with the preventive portion 15c of the handle stand 15 to thereby prevent the handle stopper 18 from being pushed out along the tapered engaging portion 15b. This prevents the handle 17 from clattering and being folded during the winding operation of the handle 17. Also, as shown in FIG. 10, if a load is applied to the handle 17 in the handle stand-up direction shown by an arrow C, then the planar surface $18a_2$ of the handle stopper 18 at the base end side thereof is contacted with the preventive portion 15d of the handle stand 15 to thereby not only prevent the handle stopper 18 from being pushed out but also prevent the handle 17 from clattering.

Figure 4:
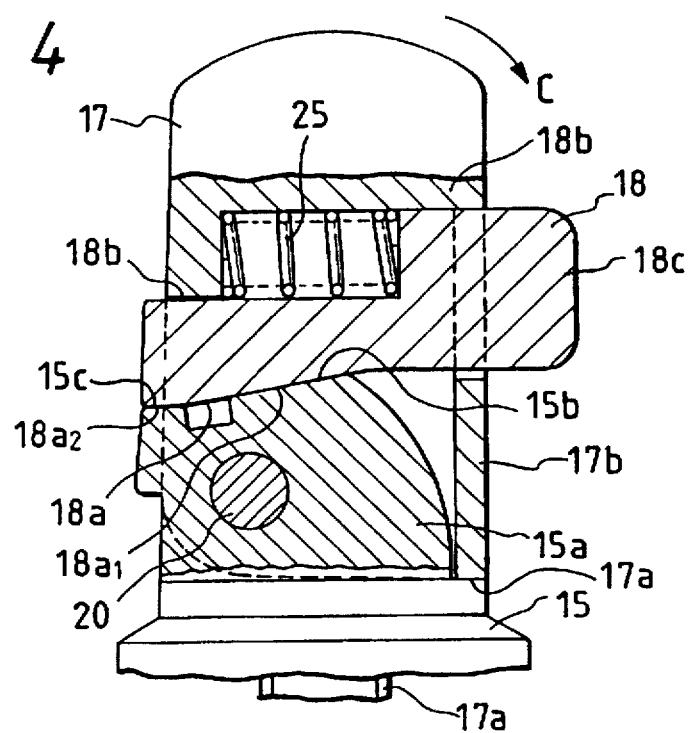
FIG. 4 is a view of a second embodiment of a handle folding device according to the invention.
Figure 5:
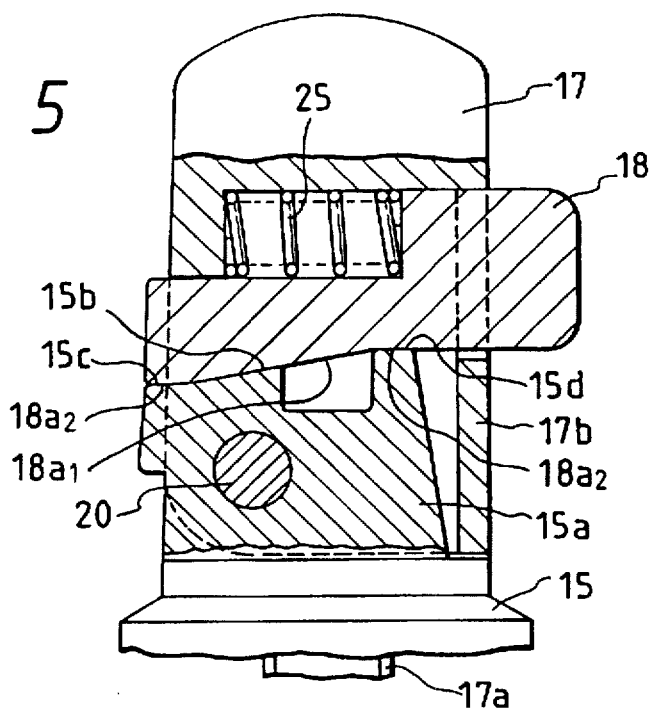
FIG. 5 is a view of a third embodiment of a handle folding device according to the invention.
Figure 7:
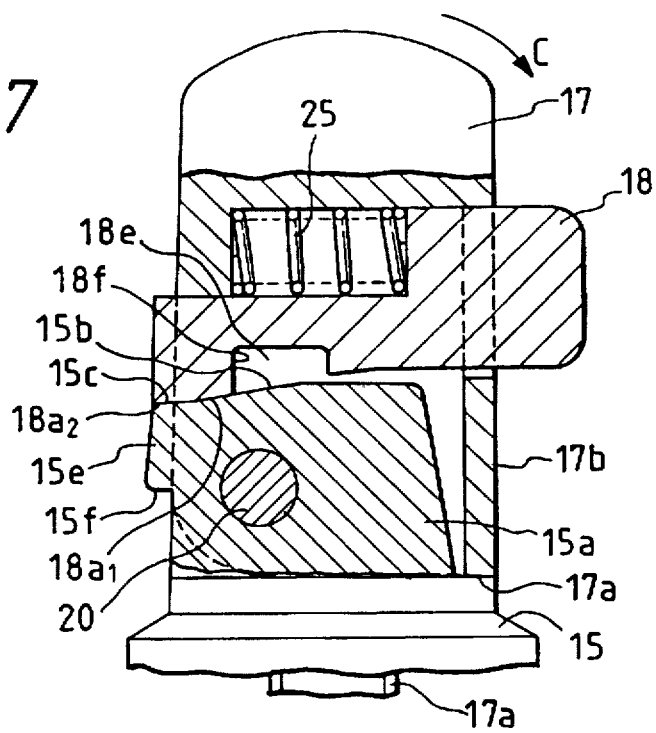
FIG. 7 is a view of another modification of a handle folding device according to the invention.
Figure 8A:
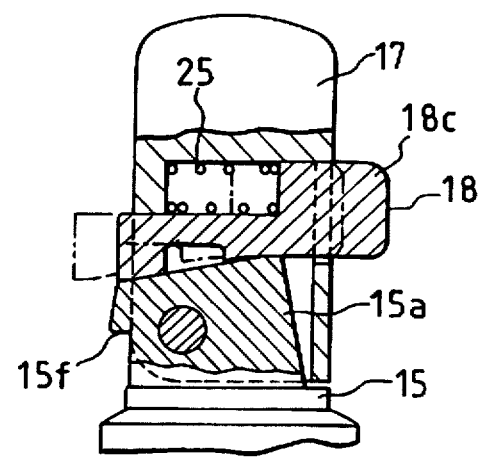
FIGS. 8A to 8C show how the modification shown in FIG. 6 is used; in particular.
Figure 8B:
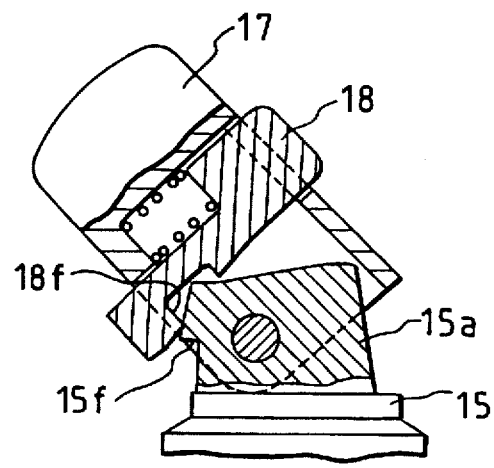
Figure 8C:
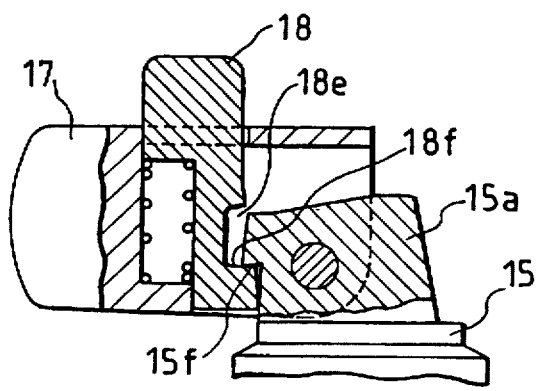

Further, the projecting portion 15a of the handle stand 15 in the present modification can be structured as in the embodiments shown in FIGS. 4 and 5, and it also can be modified in such a manner as shown in FIG. 7. In the modification shown in FIG. 7, there is shown a structure in which the tapered engaging portion and preventive portion are not formed on the handle stand-up side of the projecting portion 15a with respect to the pivotably supported portion. According to this structure, if a load is applied to a forked handle in the handle stand-up direction shown by an arrow C, then the leading end surfaces 17a of the forked handle 17 are contacted with the surface of the handle stand 15 to thereby prevent the whole handle 17 from clattering.

Figure 11:
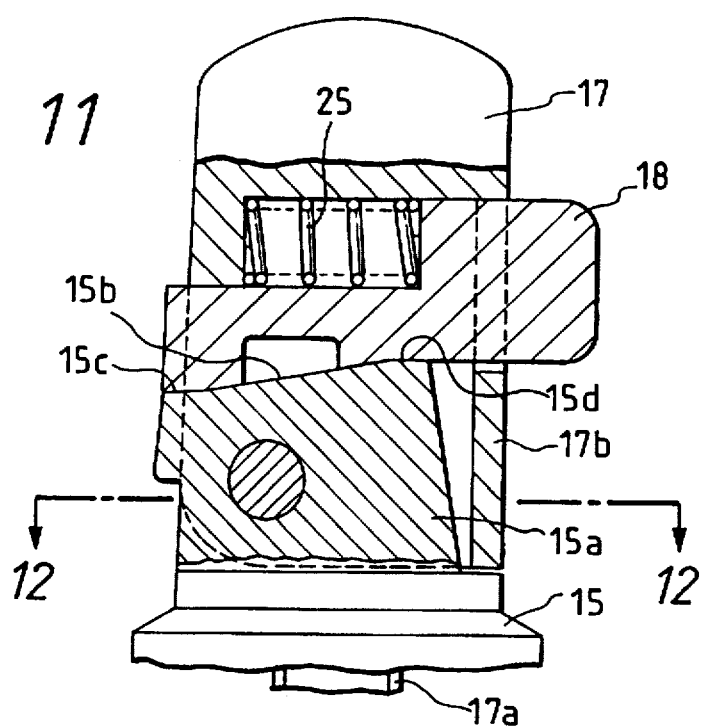
FIG. 11 is a view of a fourth embodiment of a handle folding device according to the invention.

In the above-mentioned embodiments and modifications, the preventive portion for preventing the handle 17 from being folded and clattering during the winding operation of the handle 17 is formed as a parallel surface which is substantially parallel to the slide operation surface of the handle stopper 18. However, the invention is not limited to this but, for example, the preventive portion can also be structured as shown in FIG. 11.

In the present embodiment, surfaces each having a large friction resistance are formed on the preventive portions 15c and 15d of the projecting portion 15a and/or in the handle stopper 18. The large friction surface may be formed on either one of or both of the preventive portion 15c,15d and the planar surface $18b_2$ engageable with the preventive portion 15c,15d. As the surface having a large friction resistance, as shown in FIG. 11, there can be formed notched or milled surfaces on the projecting portion 15a and/or the handle stopper 18, or there can be provided an element which has a comparatively large friction coefficient. If the preventive portions 15c and 15d are formed by the surfaces having a large friction coefficient in this manner, then the high accuracy of parallelism of the handle stopper 18 with respect to the slide operation surface is not required. Of course, in the embodiment shown in FIG. 11 as well, there can also be used similar structures to the embodiments and modifications shown in FIGS. 4 to 7.

Figure 12:
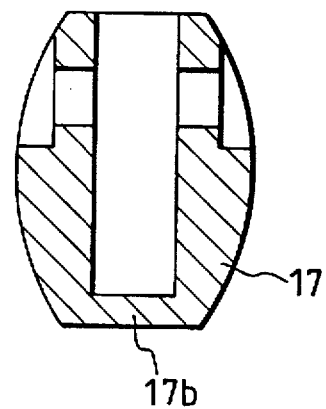
FIG. 12 is a sectional view taken along line 12—12 in FIG. 11, showing a structure of a handle portion included in a handle folding deice according to the invention.

In the above-mentioned embodiments and modifications, it is preferable that, in the leading end area of the forked handle 17, there is formed a reinforcing portion 17b for connecting the respective forked extension portions of the handle 17 with each other as shown in FIG. 12. Although FIG. 12 is a sectional view of the embodiment shown in FIG. 11, the reinforcing portion is preferably formed in all of the embodiments described above. The formation of such reinforcing portion can reinforce the handle 17 as well as makes it sure to perform a stable handle folding operation. The reinforcing portion 17b may be preferably formed integral with the handle 17 in such a manner that it is flush with the surface of the handle 17. Due to this, when the handle stopper 18 is pressed and operated with a finger, the finger can be contacted with the thus integrally formed outer peripheral surface of the handle 17 serving as the reinforcing portion 17b, so that the handle folding operation can be performed without feeling any strange feeling.

Next, description will be given below of a structure for achieving the wedge engagement stably and positively when the handle is rotated with respect to the pivotably supported member, with reference to FIGS. 13 to 15. In these figures, the same components thereof as those in the previously described embodiments are given the same designations.

Figure 13:
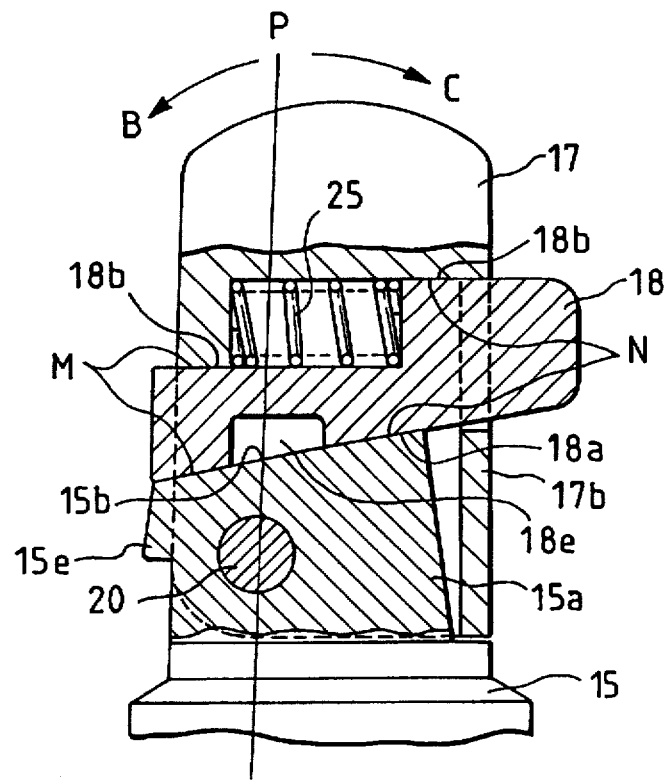
FIG. 13 is a view of a fifth embodiment of a handle folding device according to the invention.
Figure 14:
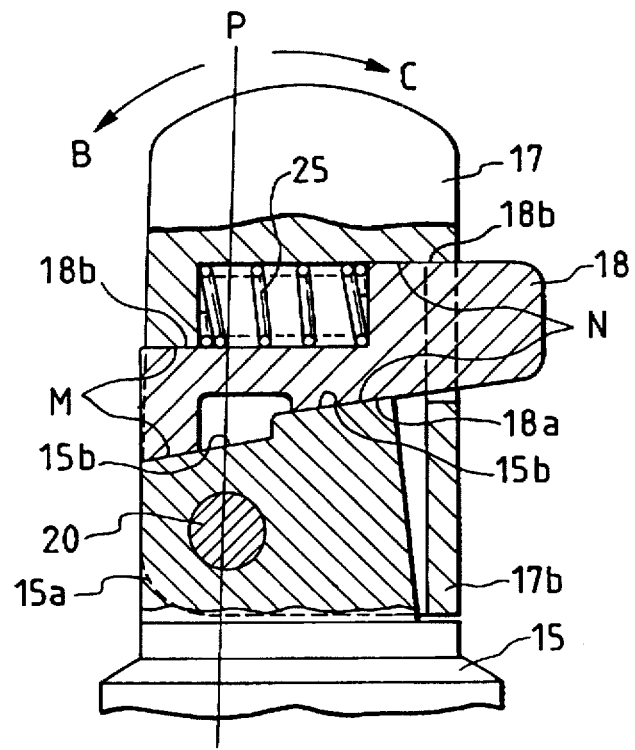
FIG. 14 is a view of a sixth embodiment of a handle folding device according to the invention.

In FIG. 13, reference character P designates a straight line which passes through the central point of the pivotably supporting member 20 and which is a reference frame for defining the folding side and the stand-up side. That is, with the straight line P as a boundary line them, an arrow B shows the folding side of the handle 17 and an arrow C shows the stand-up side of the handle 17. The handle stopper 18 is fitted with and mounted between the projecting portion 15a of the handle stand 15 and the handle 17 in such a manner that it is free to slide in a direction substantially at right angles to the axis of the handle shaft. In this case, the handle stopper 18 is in wedge engagement on both the handle folding and standing-up direction sides with respect to the pivotably supporting member 20. In particular, on the surface of the projecting portion 15a of the handle stand 15, there is formed a continuous tapered portion 15b intersecting the straight line P, and the engaging surface 18a of the handle stopper 18 can be contacted with the tapered portion 15b. Also, the slide operation surface 18b of the handle stopper 18 opposed to the engaging surface 18a thereof is in contact with the inner surface of the handle 17.

According to this structure, on both of the folding and standing-up sides of the handle 17 with respect to the pivotably supporting member 20, there are formed wedge engagement portions M and N which can reduce the amount of operation of the handle stopper 18 to thereby hold quickly and positively the handle 17 in the stand-up condition and prevent it from clattering. Also, even if the respective components such as the handle stand 15, handle 17, handle stopper 18 and the like vary in dimensions to thereby cause clearances in their engaged portions, the wedge engagement portions M and N respectively formed on both sides of the handle 17 with respect to the pivotably supporting member 20 are capable of absorbing such clearances, so that the handle 17 can be positively prevented from clattering and can be held in the stand-up position.

In this case, as shown in FIG. 13, if a recessed portion 18e shown in FIG. 6 is formed in the engaging surface 18a of the handle stopper and a projecting piece 15e is formed in the handle stand 15, then the handle 17 can be secured and held when it is folded. Also, in the wedge engagement portions M and N, the surface of the engaging surface 18a of the handle stopper 18 and/or the surface of projecting portion 15a of the handle stand 15 may not be formed as the same continuous surface but, for example, as shown in FIG. 14, the surface of the projecting portion 15a of the handle stand 15 may be stepped.

Figure 15:
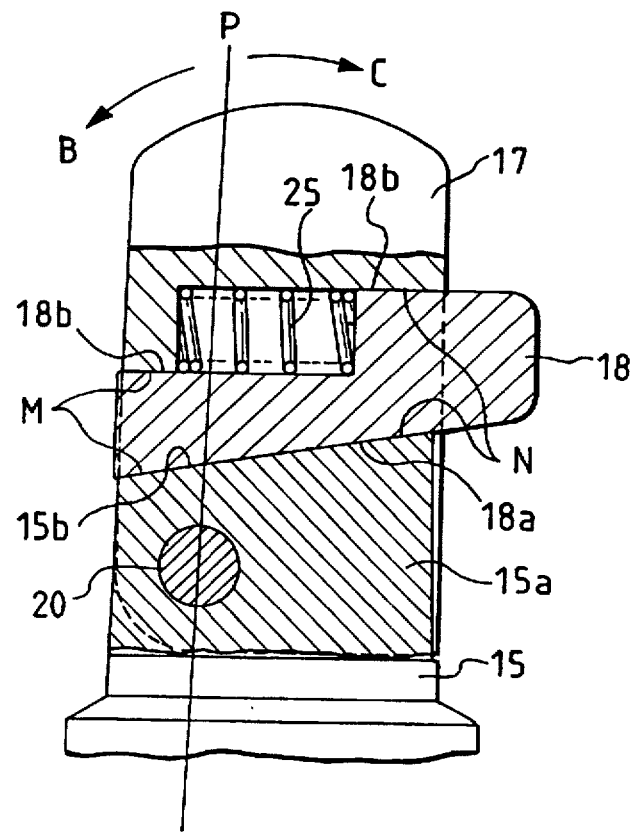
FIG. 15 is a view of a seventh embodiment of a handle folding device according to the invention.

Now, in FIG. 15, there is shown a structure in which no stepped portions, recessed portions or the like are formed on the engaging surface 18a of the handle stopper 18 and on the surface of the projecting portion 15a of the handle stand 15.

Also, in the present embodiment, a reinforcing portion 17b as shown in FIG. 12 is not formed in the forked portion of the base end side of the handle 17. In this manner, according to the invention, even in the case of a conventional forked handle 17, the handle folding device can be structured similarly.

In FIGS. 16 to 19, there is shown an eighth embodiment of a handle folding device for use in a fishing reel according to the invention, in which reference numeral 101 designates a handle shaft corresponding to the handle shaft 17a shown in FIG. 1; 102, a handle stand corresponding to the handle stand 15; 103, a handle corresponding to the handle 17; and 106, a handle stopper corresponding to the handle stopper 18.

The handle stand 102 is disposed in the end portion of the handle shaft 101, a handle 103 is fitted with the leading end portion of the handle stand 102 in such a manner that it is pivotable about a pivotably supporting portion 104 between a stand-up position to permit use of the handle and a folded potion for storage of the handle, and the handle stopper 106 including a pressure operation portion 105 is interposed between the handle stand 102 and handle 103 in such a manner that it can be freely slid in a direction angled with respect to the axis of the handle shaft 101.

Also, in the present embodiment, in the end portion of the handle stand 102 on the handle folding direction side thereof with respect to the pivotably supporting portion 104, there is formed a parallel surface 108 which is substantially parallel to a sliding surface 107 of the handle stopper 106 facing the handle arm 103.

The handle stopper 106 includes an engaging surface 109 formed on an end portion thereof and engageable with the parallel surface 108 of the handle stand 102, and a tapered engaging portion 110 for standing up the handle 103 and holding the same at the stand-up position and a pressure operation portion 105 to be operated by an angler, both formed on the other end portion thereof. Between the bottom portion of the handle 103 and a securing portion 111 of the handle stopper 106, there is interposed a spring 112 which energizes the pressure operation portion 105 of the handle stopper 106 to project the same and to stand up the handle 103 and hold the same at the stand-up position.

Figure 16:
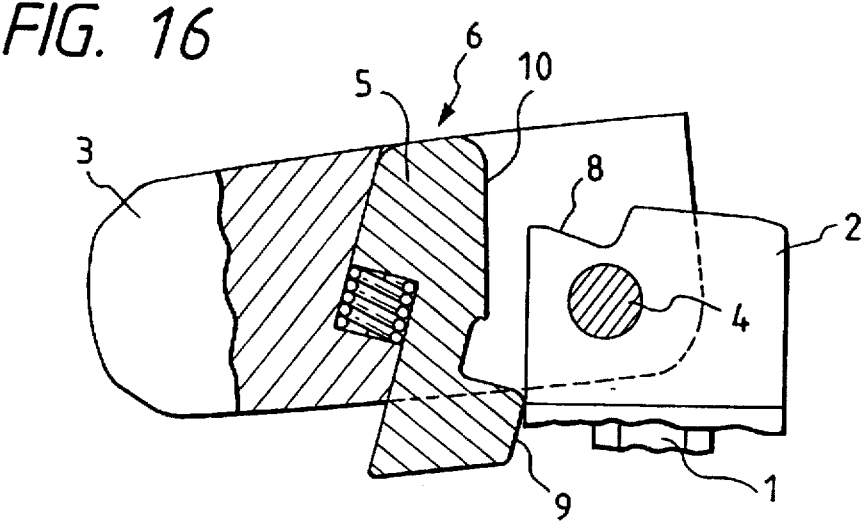
FIG. 16 is an enlarged section view of the main portions of the handle folding device according to an eighth embodiment of the invention in state where a handle is folded.
Figure 17:
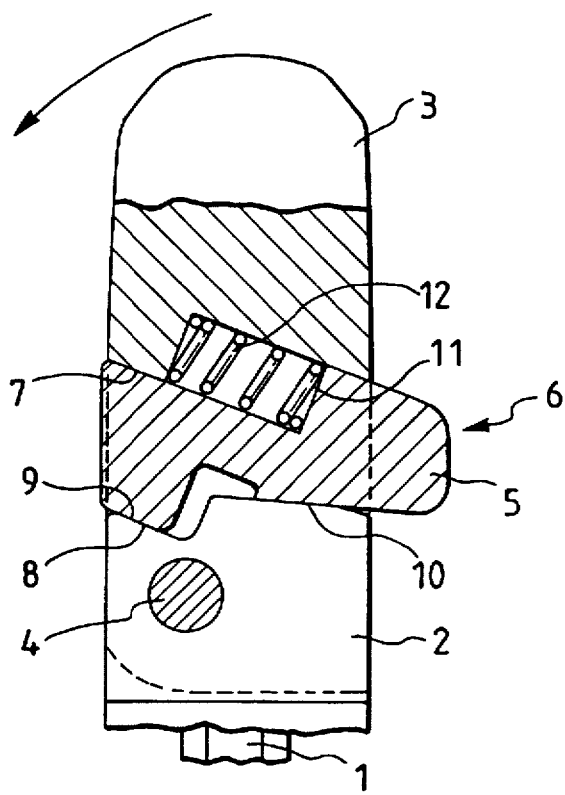
FIG. 17 is an enlarged section view of the main portions of the handle folding device shown in FIG. 16, in a state where a handle is held at the stand-up position thereof.

Since the present embodiment is structured in the abovementioned manner, in the stand-up position shown in FIG. 17 in which the handle 103 is in use, if the pressure operation portion 105 of the handle stopper 106 is pushed against the energizing force of the spring 112 to thereby press down the handle stopper 106 along the sliding surface 107 and thereafter the handle 103 is rotated counterclockwise, then the engaging surface 109 of the handle stopper 106 is disengaged from the parallel surface 108 of the handle stand 102, so that the handle 103 can be folded into the storage condition as shown in FIG. 16.

Also, if the handle 103 in the folded condition shown in FIG. 16 is rotated clockwise, then the engaging surface 109 of the handle stopper 106 is abutted against the parallel surface 108 of the handle stand 102, the handle 103 is pushed and rotated clockwise about the pivotably supported portion 104 due to the tapered engagement, and the tapered engaging portion 110 is pressed against and engaged with the leading end face of the handle stand 102, so that the handle 103 can be energized and held by the spring 112 at the stand-up position in which the handle 103 is in use.

Figure 18:
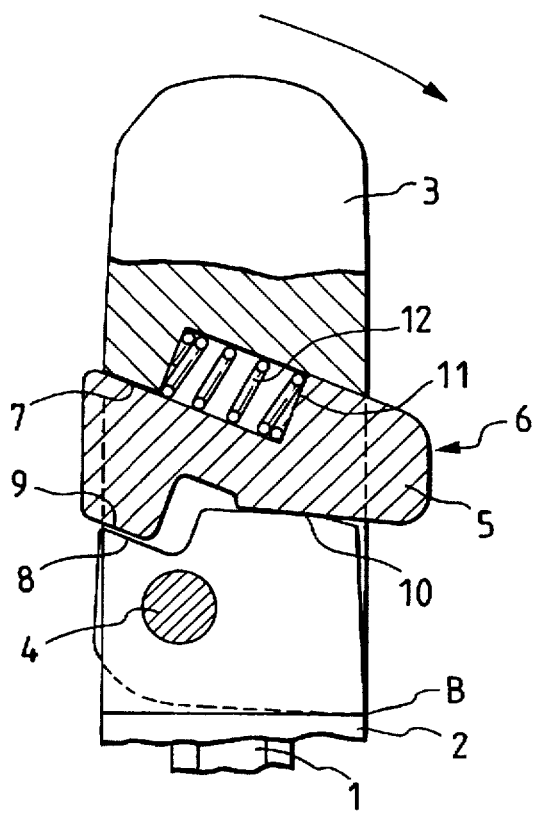
FIG. 18 is an enlarged section view of the main portions of the handle folding device shown in FIG. 16 in a state where a force is applied to the handle folding device in the handle stand-up direction.

Therefore, in the present embodiment, as shown in FIG. 18, when there is applied a force in the stand-up direction which is opposite to the folding direction, a force is applied to the handle stopper 106 in the push-out direction so that the handle stopper 106 may be pushed out to some degree. However, the end portion of the handle 103 is abutted against the handle stand 102 at a point B to thereby not only prevent the handle 103 from rotating further but also prevent the handle stopper 106 from being pushed out further.

Figure 19:
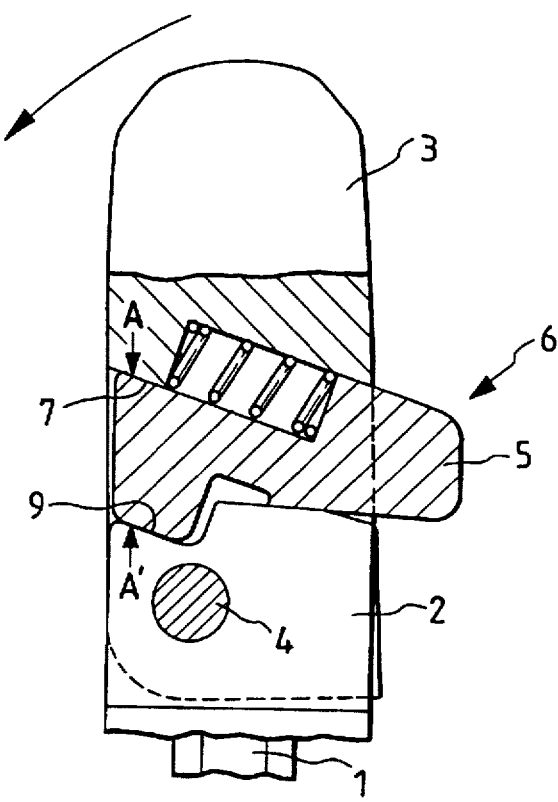
FIG. 19 is an enlarged section view of the main portions of the handle folding device shown in FIG. 16 in a state where a force is applied to the handle folding device in the handle folding direction.
Figure 20:
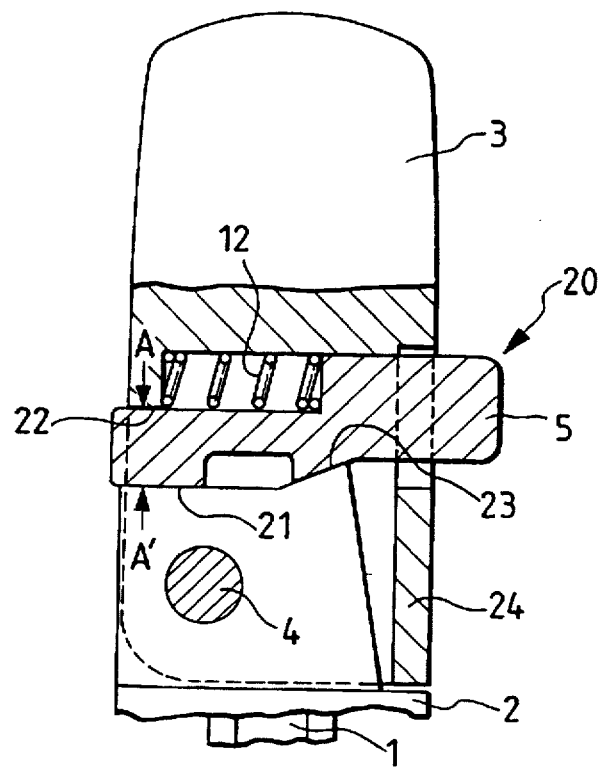
FIG. 20 is an enlarged section view of the main portions of a ninth embodiment of a handle holding device for use in a fishing reel according to the invention.
Figure 21:
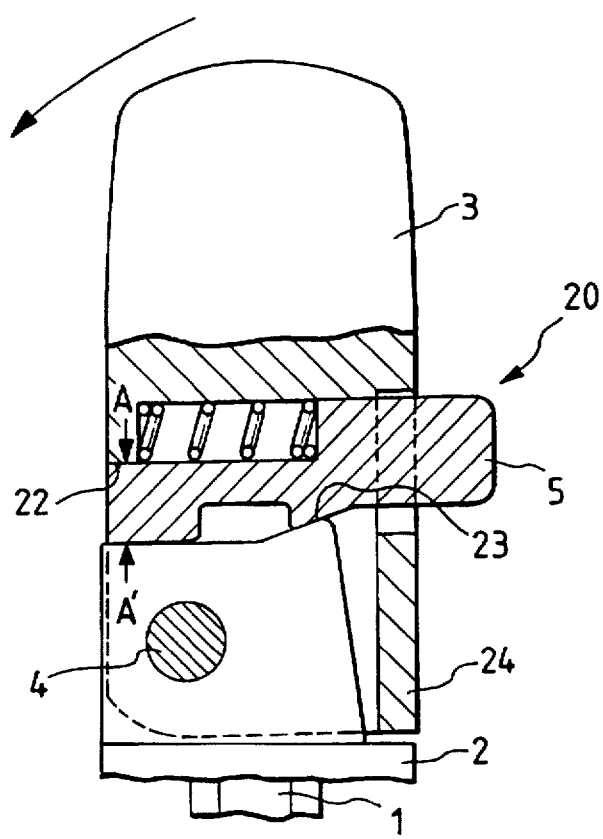
FIG. 21 is an enlarged section view of the main portions of the handle folding device shown in FIG. 20 in a state where a force is applied to the handle folding device in the handle folding direction.

Next, as shown in FIG. 19, if there is applied a force in the folding direction during the winding operation, the resultant force clamping the handle stopper 106 between the handle 103 and handle stand 102 at positions indicated by A and A' is received by the sliding surface 107 and parallel surface 109, so that the force does not act in a direction to push out the handle stopper 106. This structure is sure not only to prevent the handle stopper 106 from being pushed out unexpectedly but also to prevent the handle 103 from being folded in error.

Next, description will be given below of a ninth embodiment of a handle folding device for use in a fishing reel according to the invention.

The ninth embodiment is different from the eighth embodiment in the following respects. That is, in the eighth embodiment, the sliding surface 107 and the parallel surface 108 are respectively formed inclined and the handle stopper 106 is structured such that it can be slid in a direction angled with respect to the axis of the handle shaft 101. In contrast, in the ninth embodiment, in order that a handle stopper 120 can be slid in a direction perpendicular to the axis of the handle shaft 101, a parallel surface 121 and a sliding surface 122 are formed not inclined and a tapered engaging portion 123 is formed such that the degree of inclination thereof is rather large.

In the ninth embodiment, similarly to the eighth embodiment, upon depression of the pressure operation portion 105 of the handle stopper 120 the handle 103 is rotated counterclockwise for folding the handle 103, and the handle 103 is rotated clockwise for holding the handle 103 at the stand-up position. During the winding operation of the handle 103, the handle 103 and handle stand 102 produce the force onto the handle stopper 120 in the direction shown by arrows A and A'. Since the force by the handle 103 and the handle stand 102 is received by the surfaces 122 and 121 which are parallel to the sliding direction of the handle stopper 120, the force does not produce a component which acts in a direction to push out the handle stopper 120.

Figure 22:
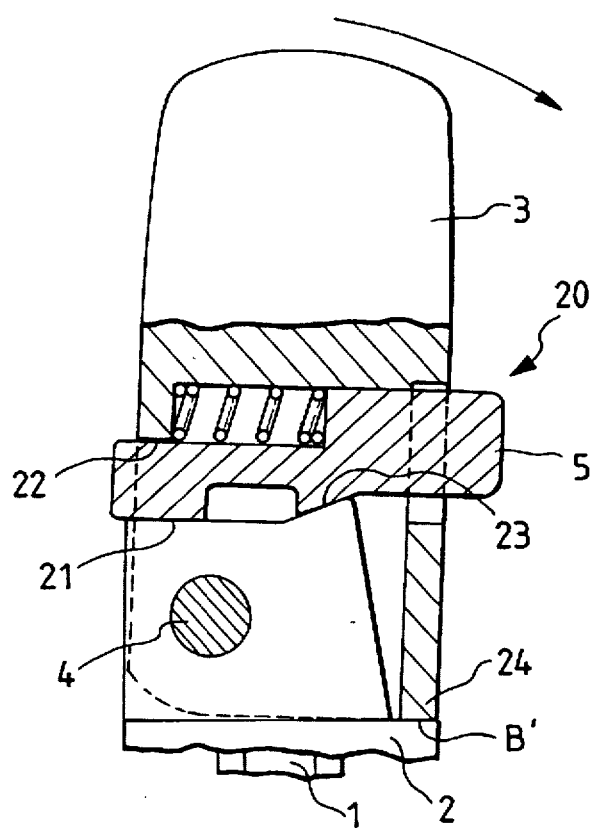
FIG. 22 is an enlarged section view of the main portions of the handle folding device shown in FIG. 20 in a state where a force is applied to the handle folding device in the handle stand-up direction.

Also, as shown in FIG. 22, if a force is applied to the handle stopper 120 in the opposite direction to the handle folding direction, i.e. in the handle stand-up direction, then the handle stopper 120 is pushed out some degree but the end portion 124 of the handle 103 is abutted against the handle stand 102 at a point B' to thereby not only prevent the handle 103 from rotating further but also prevent the handle stopper 120 from being pushed out. For this reason, similarly to the eighth embodiment, the structure according to the ninth embodiment not only is able to surely prevent the handle 103 from being folded in error but also facilitates the pressing operation of the pressure operation portion 105.

As has been described heretofore, according to the invention, there is provided a handle folding device in a fishing reel, in which a pivotably portion for pivotably supporting a handle to be set at a stand-up position to permit use of the handle and at a folded position for storage of the handle is provided in a handle stand disposed in the end portion of a handle shaft, and a handle stopper including an operation portion and an engaging portion formed between the handle stand and handle is mounted such that it is free to slide in a direction substantially at right angles to the handle, and the operation portion of the handle stopper is energized in the projecting and energizing direction thereof to stand up and hold the handle at the stand-up position. At least in the handle side end portion on the handle folding side with respect to the pivotably supporting portion of the handle stand, there is formed a tapered engaging portion for standing up and holding the handle and, adjacently to the tapered engaging portion, there is formed a preventive portion for preventing the movement of the handle stopper.

The handle of the fishing reel can be moved from the stand-up position to the folded position by operating the handle stopper. In this case, according to the invention, the tapered engaging portion and the preventive portion for preventing the movement of the handle stopper respectively formed in the handle stand are in contact with the handle stopper. The preventive portion is located adjacent to the tapered engaging portion which is formed so as to stand up and hold the handle due to its wedge action, and, when a high load is applied to the handle, the preventive portion prevents the handle stopper from being moved due to the high load.

Also, according to the invention, there is provided a handle folding device in a fishing reel, in which a pivotably supporting portion for pivotably supporting a handle to be set at a stand-up position to permit use of the handle and at a folded position for storage of the handle is provided in a handle stand disposed in the end portion of a handle shaft, and a handle stopper including an operation portion and an engaging portion formed between the handle stand and handle is mounted such that it is free to slide in a direction substantially at right angles to the handle, and the operation portion of the handle stopper is energized in the projecting and energizing direction to stand up and hold the handle at the stand-up position. In order to allow the handle stopper to achieve its wedge engagement between the handle stand and handle, there are formed in the handle stopper two wedge engaging portions respectively on the handle folding and standing-up direction sides with respect to the pivotably supporting portion of the handle stand.

According to the invention, there are formed two wedge engaging portions respectively in both directions of the handle folding and standing-up direction sides thereof, whereby, when the handle is rotated with respect to the pivotably supporting portion, the two wedge engaging portions can be wedge-engaged with each other stably and positively.

According to the invention, there is provided a handle folding device for use in a fishing reel in which a handle is pivotably supported on a handle stand provided in the end portion of a handle shaft in such a manner that the handle can be rotated between a stand-up position permitting use of the handle and a folded portion for storage of the handle, and a handle stopper including an operation portion is slidably mounted between the handle stand and handle, and the operation portion of the handle stopper is energized by energizing means in a direction to project the handle stopper to thereby be able to stand up the handle and hold the handle at the stand-up position, while the handle can be rotated to the folded position by operating the operation portion of the handle stopper. The handle folding device includes an first engagement element provided on the handle folding side of the handle stand, and a second engagement element provided on the handle stand side of the handle stopper and, when the handle is folded, the first and second engagement elements are engageable with each other due to the energizing force of the energizing means, while the handle folding device can energize and hold the handle on the handle stand due to the energizing force of the energizing means.

According to the invention, the parallel surface substantially parallel to the sliding surface is formed in the end portion of the handle stand on the handle folding direction side thereof with respect to the pivotably supporting portion, and the engaging surface engageable with the parallel surface is formed in the end portion of the handle stopper, while the tapered engaging portion for standing up the handle and holding the handle at the stand-up position and the pressure operation portion are formed in the other end portion of the handle stopper. Due to this, even if a high load is applied to the handle in the handle folding direction during the winding operation of the handle, it is possible not only to prevent the handle stopper from being pushed out but also to prevent the handle from being folded in error during the winding operation thereof.

What is claimed is:

1. A handle folding device for use in a fishing reel, comprising:

a handle stand formed on an end of a handle shaft, said handle stand defining a first preventive surface extending in a first direction, and a first tapered engaging portion extending obliquely with respect to the first preventive surface;

a handle supported on the handle stand pivotable between a stand-up position to permit use of the handle and a folded position for storage of the handle, said handle having a second surface extending parallel to said preventive surface when said handle is pivoted to said stand-up position;

a handle stopper mounted between the handle stand and the handle, and slidable in a direction parallel to said preventive surface when said handle is located at said stand-up position, the handle stopper having an operation portion and defining a third planar surface contactable with the first preventive surface and a second sloped surface contactable with the first tapered engaging portion, wherein said third planar surface is located opposite from the operation portion with respect to the second sloped surface, said sloped surface contacting said first tapered engaging portion and said planar surface contacting said first preventive surface when said handle is in said stand up position; and energizing means for energizing said handle stopper to forcible contact sloped surface with the first tapered surface when said handle is pivoted to said stand-up position to thereby maintain said handle at said stand-up position using a wedge action.

2. A handle folding device for use in a fishing reel as set forth in claim 1, wherein said handle stand further defines a second preventive surface located opposite from said first preventive surface with respect to the first tapered surface, and said handle stopper further defines a second planar surface contactable with said second preventive surface.

3. A handle folding device for use in a fishing reel as set forth in claim 1, further comprising:

a recess formed in said handle stopper;

a projection formed on said handle stand and engageable with said recess when said handle is pivoted to said folded position, wherein:

said energizing means energizes said handle stopper such that said recess is brought into engagement with said projection when said handle is pivoted to said folded position, to thereby elastically retain said handle at said folded position.

4. A handle folding device for use in a fishing reel, comprising:

a handle stand formed on an end of a handle shaft; a handle mounted on the handle stand and pivotable about an pivot axis to move between a stand-up position to permit use of said handle and a folded position for storage of said handle, said handle folding device defining a handle stand-up direction side defined by one side of a line intersecting said pivot axis and parallel to a longitudinal axis of said handle when in said stand-up position, and a handle folding direction side opposite said stand-up direction side which said handle is located when in said handle folding position, said handle stand having a tapered engaging portion;

a handle stopper having an engaging portion and slidably interposed between said handle stand and said handle, said engaging portion adapted to engage said tapered engaging portion of said handle stand when in said stand-up position; and energizing means for urging said handle stopper to stand up said handle and maintain said handle at said stand-up position through said engaging portion in cooperation with said tapered engaging portion of said handle stand, wherein;

a preventive portion for preventing movement of said handle stopper when said handle is in said stand-up position is formed on an end portion of said handle stand and located adjacent to said tapered engaging portion, said end portion having a surface facing said handle stopper and positioned to engage said handle stopper when in said stand-up position.

5. A handle folding device for use in a fishing reel as set forth in claim 4, wherein said tapered engaging portion is formed on said end portion of said handle stand.

6. A handle folding device for use in a fishing reel as set forth in claim 4, wherein said tapered engaging portion is formed on a portion of said handle stand located in said handle stand-up direction side.

7. A handle folding device for use in a fishing reel as set forth in claim 4, wherein said tapered engaging portion is formed to extend from said handle folding side to said handle stand-up side.

8. A handle folding device for use in a fishing reel as set forth in claim 4, wherein another preventive portion for preventing movement of said handle stopper is formed on a portion of said handle stand located in said handle stand-up direction side.

9. A handle folding device for use in a fishing reel as set forth in claim 4, wherein said preventive portion is formed as a parallel surface substantially parallel to a direction in which said handle stopper is slidable.

10. A handle folding device for use in a fishing reel, comprising:

a handle stand formed on an end of a handle shaft; a handle mounted on said handle stand and pivotable about a pivot axis to move between a stand-up position to permit use of said handle and a folded position for storage of said handle, said handle defining a handle stand-up direction side with respect to said axis when said handle is in the stand-up position and a handle folding direction side with respect to said axis when said handle is in the folded position;

a handle stopper slidably fitted between said handle stand and said handle; and energizing means for energizing said handle stopper in a direction to stand up and hold said handle in said stand-up position, wherein;

a wedge engaging portion is formed on both sides of a line intersecting said pivot axis and parallel to a longitudinal axis of said handle when in said stand-up position such that said handle stopper achieves a wedge engagement between said handle stand and said handle with the aid of said energizing means.

11. A handle folding device for use in a fishing reel, comprising:

a handle stand formed on an end of a handle shaft and having a tapered engaging portion;

a handle is mounted on said handle stand and pivotable between a stand-up position for storage of said handle;

a handle stopper having an engaging portion to engage said tapered engaging portion when in said stand up position and slidably mounted between said handle stand and said handle, said handle stopper having a recessed portion formed intermediate two ends of said engaging portion;

energizing means for energizing said handle stopper to maintain said handle at said stand-up position when said handle is pivoted to said stand-up position; and a securing piece formed on said handle stand, wherein:

when said handle is folded, said recessed portion of said handle stopper captures said securing piece of said handle stand, whereby said energizing means produces a force to maintain said handle at said handle folding position.

12. A handle folding device for use in a fishing reel comprising:

a handle stand formed on an end of a handle shaft, said handle stand having;

a projection portion extending from handle shaft terminating at an end surface, said end surface having a preventive portion and a tapered engaging portion, said preventive portion and said tapered engaging portion being oriented obliquely with respect to one another;

a handle pivotably supported about a pivot axis on said handle stand between a stand-up position to permit use of said handle and a folded position for storage of said handle, said handle defining a handle stand-up direction side with respect to said axis when said handle is in the stand-up position and a handle folding direction side with respect to said axis when said handle is in the folded position;

a handle stopper slidable mounted between said handle and said projecting portion, said handle stopper having a planar surface to contact said preventive portion of said projecting portion, a sloped surface to contact said tapered engaging portion of said end surface of said projecting portion, and a operation surface to contact an inside surface of said handle;

an energizing means disposed between said handle and said handle stopper for biasing said handle stopper such that said handle stopper forms a wedge between said handle and said projecting portion, wherein;

when said handle is in said up-standing position, the interaction of said preventive portion and said planar surface prevents said handle stopper from dislodging from said biased position to maintain said handle in said up-standing position.

13. A handle folding device for use in a fishing reel as set forth in claim 12, wherein said end surface of said projecting portion includes a recess positioned between said preventive portion and said tapered engaging portion.

14. A handle folding device for use in a fishing reel as set forth in claim 13, wherein;

said preventive portion and said tapered engaging portion are positioned on opposites sides of a line extending from said recess formed in said end surface and said axis.

15. A handle folding device for use in a fishing reel as set forth in claim 12, wherein said preventive portion is positioned adjacent said handle folding direction side with respect to said axis.

16. A handle folding device for use in a fishing reel as set forth in claim 12 wherein;

said handle stopper comprises a recess formed between said planar surface and said sloped surface; and said projecting portion includes a securement piece extending in a direction toward said folding direction side;

when said handle is in said folded position said recess formed in said handle stopper captures a portion of said securement piece, said energizing means urges said handle stopper to maintain said stopper in said folded position.

\* \* \* \* \*